United States Patent
Tsukamoto et al.

(10) Patent No.: US 6,814,544 B2
(45) Date of Patent: Nov. 9, 2004

(54) METHOD FOR MANUFACTURING TURBINE BLADE AND MANUFACTURED TURBINE BLADE

(75) Inventors: Takeshi Tsukamoto, Hitachi (JP); Kunio Miyazaki, Hitachi (JP); Masahisa Inagaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 10/228,103

(22) Filed: Aug. 27, 2002

(65) Prior Publication Data

US 2003/0143074 A1 Jul. 31, 2003

(30) Foreign Application Priority Data

Jan. 30, 2002 (JP) ........................................ 2002-020875

(51) Int. Cl.⁷ .................................................. F01D 5/18
(52) U.S. Cl. .................... 416/96 R; 416/224; 29/889.1; 219/78.02; 219/117.1
(58) Field of Search .............................. 29/889.1, 889.7, 29/889.721; 219/78.02, 78, 117.1, 118, 119; 416/1, 95, 96 R, 97 R, 232, 233, 224, 229 A, 229

(56) References Cited

U.S. PATENT DOCUMENTS

| | | | | |
|---|---|---|---|---|
| 4,411,597 A | * | 10/1983 | Koffel et al. | ................ 416/224 |
| 4,650,399 A | * | 3/1987 | Craig et al. | ................ 416/96 A |
| 6,515,250 B2 | * | 2/2003 | Miyasaka et al. | ......... 219/78.02 |

FOREIGN PATENT DOCUMENTS

| | | | | |
|---|---|---|---|---|
| JP | 05031588 A | * | 2/1993 | ........... B23K/20/00 |
| JP | 11-158514 | | 6/1999 | |
| JP | 2002-59270 | | 2/2002 | |

* cited by examiner

*Primary Examiner*—Justine R. Yu
*Assistant Examiner*—Richard A. Edgar
(74) *Attorney, Agent, or Firm*—Crowell & Moring LLP

(57) ABSTRACT

In a joining method for manufacturing a rotor blade by joining a plurality of members, the members are pressed so as to exert a predetermined pressure on the bonding interface. A pulse voltage is applied to the members to pass electric current therethrough, and the joint portion is heated by resistance heating generated at the bonding interface and in the bulk of the members to cause diffusion bonding and thereby to join the members to each other. With this method, good joining can be achieved without substantially changing the crystal structure and mechanical properties of the base metals.

5 Claims, 6 Drawing Sheets

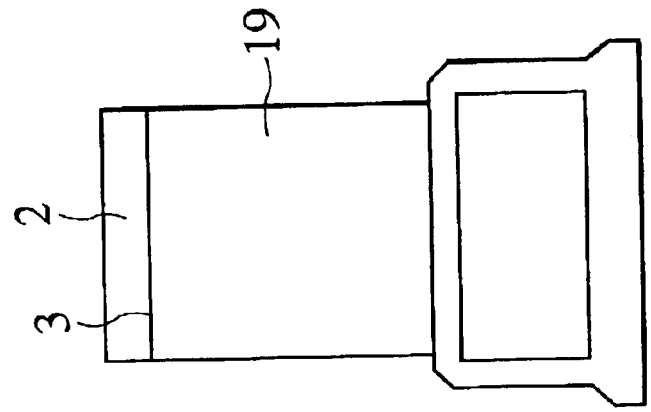
FIG.8A — FIRST STEP
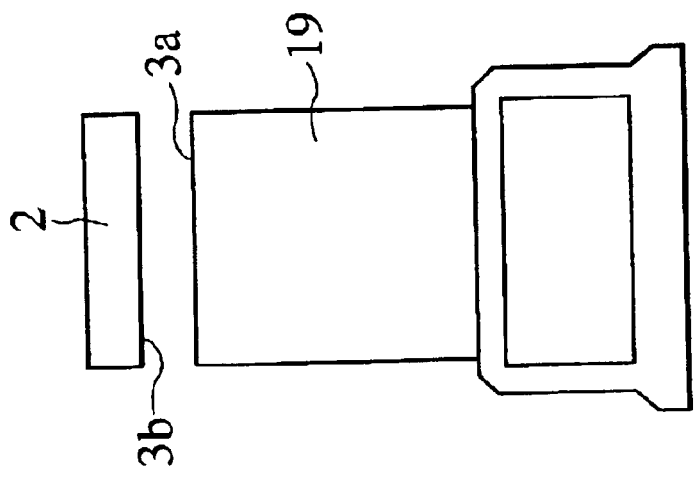
FIG.8B — SECOND STEP
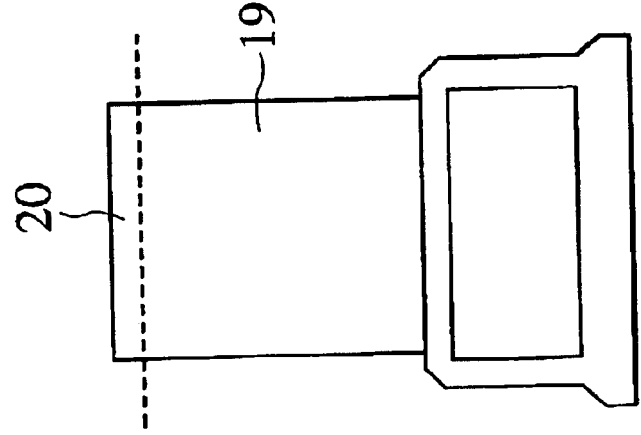
FIG.8C — THIRD STEP

METHOD FOR MANUFACTURING TURBINE BLADE AND MANUFACTURED TURBINE BLADE

BACKGROUND OF THE INVENTION

The present invention relates to a method for manufacturing a turbine blade by joining a plurality of members, and particularly to a method for manufacturing a turbine blade formed of a nickel base heat-resistant alloy, and a turbine blade manufactured thereby.

In general, the gas turbine blade is in many cases manufactured by using a nickel base heat-resistant alloy and precision casting in order to cope with higher temperatures. In this case, many techniques of providing a complicated cooling passage in the inside of the turbine blade for cooling with a cooling gas (mainly, air) are applied.

The cooling passage is formed by use of a core at the time of casting, and the core support hole is left in the cast blade, so that the airfoil tip is in an opened condition. Therefore, in a gas turbine using a blade cooling system of the closed type in which the cooling gas is not allowed to flow out of the blade, the core support hole left at the airfoil tip must be sealed off to obtain a product. As a method of sealing the core support hole, arc welding, laser beam welding, electron beam welding and the like are used. However, the nickel base heat-resistant alloy forming the turbine blade is susceptible to crack due to lowering of ductility of grain boundary at the time of welding, and, therefore, it is difficult to obtain a sound weld.

In addition, since the turbine blade is worn with the use thereof and allowed to thin down, the worn turbine blade is replaced with a new blade at the time of overhaul or the like. The worn blade is subjected to repair for recovering the consumed portion to its original size, whereby a reusable blade is manufactured. However, also in the case of overlaying which is used for the repair, there is the problem of the weld crack mentioned above and it is difficult to obtain a sound weld.

As a method for welding the turbine blade without generating the weld crack, methods of lowering the crack susceptibility by controlling the composition of the weld metal are disclosed in Japanese Patent Laid-open Nos. 1-107973 (1989), 2001-90502, and 2001-158929 and the like. Besides, methods of controlling the temperature of the material to be welded so as to alleviate thermal stress and to thereby prevent cracking are disclosed in, Japanese Patent Laid-open Nos. 5-192785 (1993), 6–198438 (1994), and 2001-269784 and the like.

On the other hand, as a method for joining the turbine blade members other than welding, methods in which an insert metal having a fusion temperature lower than that of the blade members to be joined is interposed between the blade members, and the insert metal is melted by heating it to a temperature lower than the fusion temperature of the blade members and higher than the fusion temperature of the insert metal to cause diffusion bonding through utilization of a liquid phase generated between the blade members are disclosed in Japanese Patent Laid-open Nos. 5-31588 (1993) and 2000-263247. By these methods, joining without causing cracking can be achieved.

According to the welding methods described in the above-mentioned prior arts, though the cracking generated at the time of welding of the turbine blade members can be prevented, strain aging cracking may occur at a portion of the weld in the case of conducting a heat treatment such as an aging heat treatment after welding, possibly leading to a lowering in production yield.

In addition, since the portion having undergone fusion and solidification is different from the original blade member in crystal structure, there is the problem that properties such as strength are lowered. This effect is particularly conspicuous in the case of crystal orientation controlled alloys such as a single crystal alloy and a directionally solidified alloy.

According to the diffusion bonding methods utilizing the liquid phase described in the prior arts, also, though the cracking due to the bonding can be prevented, a lowering in strength due to the components of the insert metal at the joint may occur. To obviate this problem, it is necessary to perform a sufficient diffusion treatment at high temperatures, thereby making uniform the distributions of component elements contained in the joint. Therefore, there are the problems that the microstructure of the blade members is changed due to long-time heating and the original properties thereof may be damaged, or that the period of time required for the joining step is long and productivity is lowered.

SUMMARY OF THE INVENTION

It is an object of the present invention to provide a method for manufacturing a turbine blade by which cracking due to joining would not easily be generated and joining can be achieved at lower temperatures and in a shorter time as compared with the liquid phase diffusion bonding, and a turbine blade manufactured by the method.

The present invention resides in a method for manufacturing a turbine blade by manufacturing an airfoil portion of a turbine blade comprising the airfoil portion and a dovetail portion through joining a plurality of members, comprising the steps of: bringing the members to be joined into contact with each other, and applying pressure to the members to keep the contact state thereof; and applying a pulse voltage to the members to pass an electric current therethrough so as to heat the bonding interface by resistance heating for diffusion bonding.

Modes of the present invention will be described below.

In a first method, a pulse voltage is applied to a plurality of members to pass an electric current therethrough while applying a predetermined pressure to the bonding interface between the members, and the joint portion is heated in a predetermined temperature range for a predetermined time by resistance heating generated at the bonding interface and in the bulk of the members, whereby the members are joined to each other.

A second method is a method of forming a turbine airfoil portion by joining a primary member of turbine airfoil portion having a cooling passage therein and an airfoil tip member having the function of sealing the cooling passage. In this method, a pulse voltage is applied to the members to be joined to pass an electric current therethrough while applying a predetermined pressure to the bonding interface, and the joint portion is heated in a predetermined temperature range for a predetermined time by resistance heating generated at the bonding interface and the bulk of the members, whereby the members are joined to each other.

In a third method, the joint portion is heated in a predetermined temperature range for a predetermined time by heating by an auxiliary heating means other than the passing of electric current, whereby the members are joined to each other.

In a fourth method, the members to be joined are vibrated by an ultrasonic vibrator during the heating for joining the members.

The pressure applied to the bonding interface at the time of joining is preferably in the range of 10 to 99 t based on the tensile strength at the heating temperature of the member that has the lowest tensile strength at the heating-maintaining temperature. The heating temperature for the joint portion is preferably in the range of 0.6 to 0.99 times the fusion temperature of the member that has the lowest fusion temperature. The heating of the joint portion is preferably maintained for a period of time in the range of 60 to 7200 sec. The joining is preferably performed in a vacuum atmosphere of $10^{-3}$ to $10^{-7}$ Torr or in an inert gas atmosphere.

The method according to the present invention is most effective where the members constituting the turbine blade are each formed of a nickel base superalloy. It is extremely preferable that the members constituting the turbine blade are formed of nickel base superalloys, all or part of the members are formed of crystal orientation controlled alloys having the same crystal structure, and a difference in <100> crystal orientation between the crystal orientation controlled alloys at the joint portion of the crystal orientation controlled alloy members is within 5°.

In order to ensure that all or part of the members constituting the turbine blade are formed of crystal orientation controlled nickel base alloys having the same structure and the difference in <100> crystal orientation between the nickel base alloys at the joint portion is within 5°, it is preferable to crop the crystal orientation controlled alloy members constituting the blade from a single casting with the <100> crystal orientation at the bonding interface aligned.

In addition, the present invention provides a method for manufacturing an airfoil portion of a turbine blade by joining a plurality of members formed of the same or different nickel base superalloys, wherein a pressure is exerted on the members to be joined so as to apply a pressure of 10 to 100 MPa to the bonding interface, a pulse voltage is applied to the members to pass an electric current therethrough so as to heat the joint portion to a temperature of 1000 to 1280° C. by resistance heating, and the passing of electric current is continued to maintain the joint portion at that temperature for 5 to 60 min.

The turbine blade according to the present invention has a structure in which a plurality of members constituting the turbine blade are mated to each other, and the bonding interface has undergone diffusion bonding.

According to the present invention, a turbine blade formed of a nickel base heat-resistant alloy or alloys can be manufactured by joining a plurality of members without causing cracking at the joint portion or a lowering in material properties due to thermal effects, and reliability of the turbine blade is enhanced.

BRIEF DESCRIPTION OF THE DRAWINGS

Other objects and advantages of the invention will become apparent from the following description of embodiments with reference to the accompanying drawings in which:

FIGS. 8A to 8C are conceptual diagrams showing a first to third steps, respectively, of a method for manufacturing a turbine blade described in Embodiment 3 of the present invention.

DETAILED DESCRIPTION OF THE PREFERRED EMBODIMENTS

Methods for manufacturing a turbine blade according to preferred embodiments of the present invention will be described below, referring to FIGS. 1 to 9.

[Embodiment 1]

Figure 1:
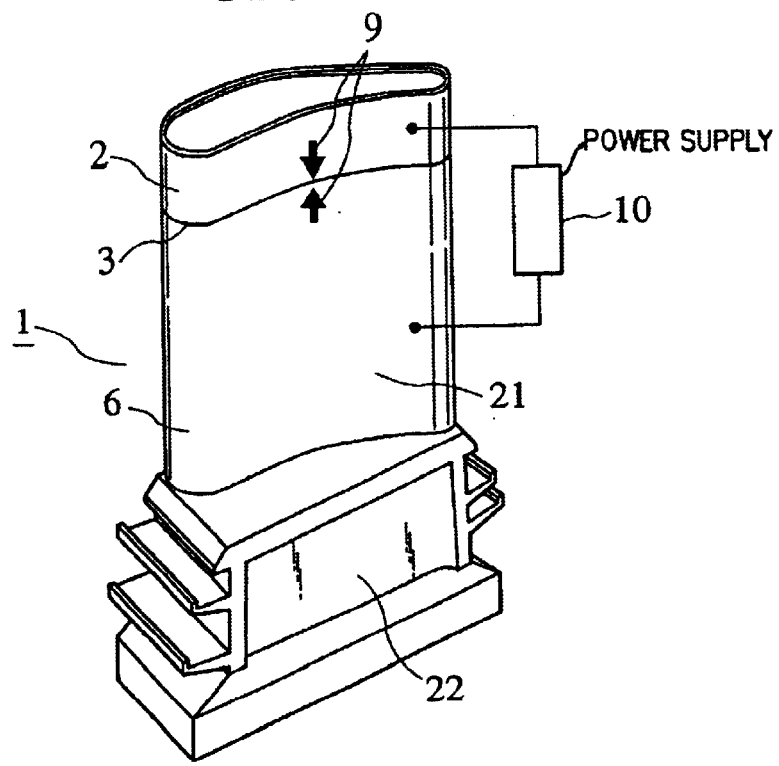
FIG. 1 is a conceptual view showing a joining method for a turbine blade according to Embodiment 1 of the present invention.
Figure 2:
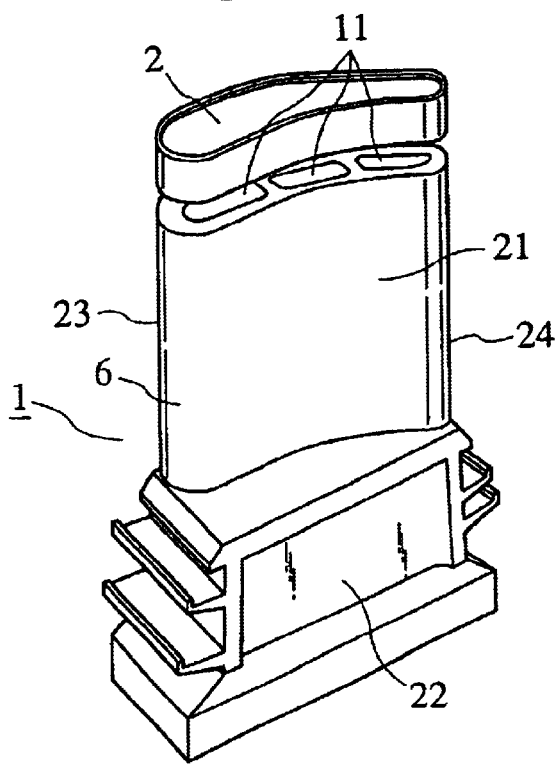
FIG. 2 is a perspective view showing the shapes, before joining, of the members used for constituting the turbine blade.

In a first embodiment, a method for manufacturing an airfoil portion of a turbine blade or a rotor blade by joining two members formed of a single crystal nickel base alloy will be described. The rotor blade consists of an airfoil portion 21 and a dovetail portion 22, as shown in FIGS. 1 and 2. The airfoil portion 21 comprises a primary member of airfoil portion 6 having cooling passages 11 therein and an airfoil tip member 2, and the two members are joined to each other at a bonding interface 3.

In this embodiment, the manufacturing method generally comprises the following steps.

In a first step, the member used for the portion other than the airfoil tip of the rotor blade 1 and the member used for the airfoil tip are manufactured by precision casting.

Figure 3:
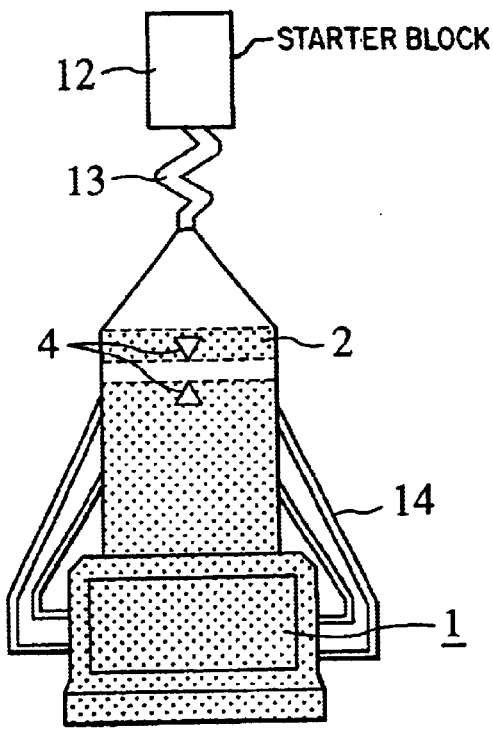
FIG. 3 is a schematic diagram showing an example of cropping a primary member of airfoil portion and an airfoil tip member from a single crystal material obtained by precision casting.

Next, in a second step, the primary member of airfoil portion 6 and the airfoil tip member 2 are machined to form the bonding surfaces (bonding interface) 3. The bonding interface need not be a plain surface, but may have a curvature. Though the primary member of airfoil portion and the airfoil tip member may be cast separately, it is desirable to cast both members as an integral member and then to crop the two members by machining, as shown in FIG. 3. This makes it easy to obtain such an orientation that the difference in <100> crystal orientation between the primary member of airfoil portion 6 and the airfoil tip member 2 at the bonding interface 3 shown in FIG. 1 is within 5°. In this case, working efficiency is enhanced when the primary member of airfoil portion 6 and the airfoil tip member 2 are provided with marks 4 indicating the orientations at the time of joining, by casting or machining. Instead of providing the marks 4 indicating the orientations, a method may be adopted in which projections are provided in place of the marks 4, or the outside circumferential shapes of the primary member of airfoil portion 6 and the airfoil tip member 2 at the bonding interface 3 are made to coincide with each other. The member (casting) shown in FIG. 3 comprises a starter block 12, a selector block 13, and a bypass block 14 used in the manufacture of a single crystal casting by a directional solidification method. The starter block 12 is a solidification starting block for generating directionally solidified columnar dendrite at the time of casting; solidification is caused to progress from this block, then one of a plurality of columnar dendrites is selected at the selector block 13, and the selected columnar dendrite is further grown while being extended laterally to produce a single crystal member. At a portion where single crystal solidification is difficult, the bypass block 14 is provided to thereby restrain the generation of grains of different orientation.

Figure 4:
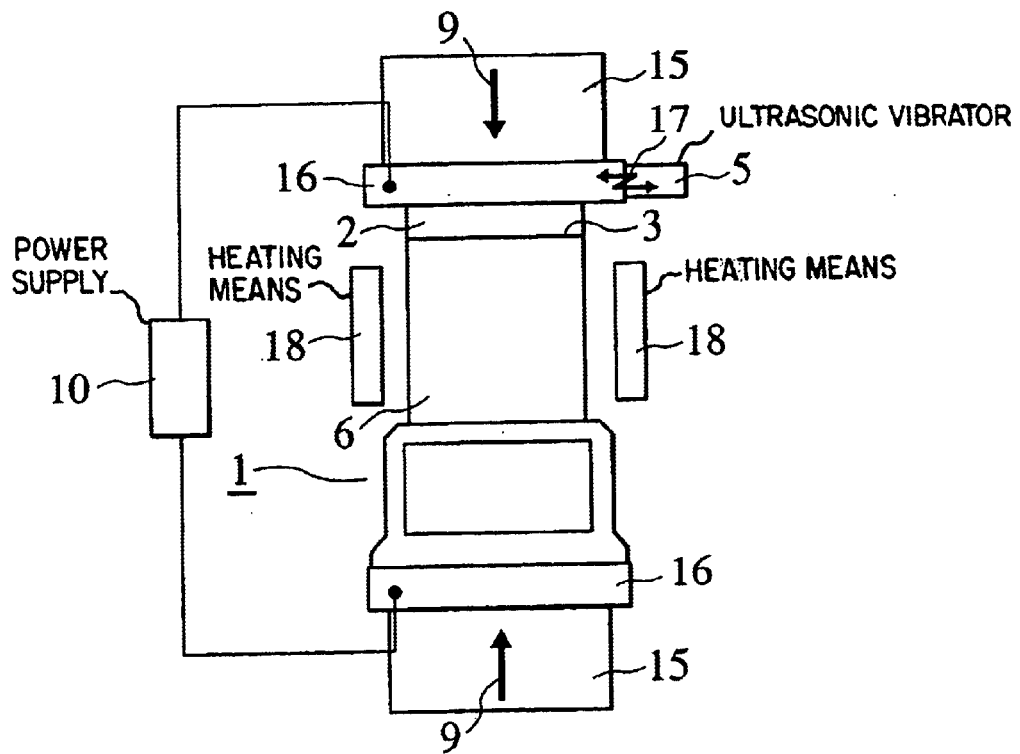
FIG. 4 is a conceptual diagram showing the constitution of a bonding apparatus used in Embodiment 1 of the present invention.

In a third step, as shown in FIGS. 1 and 4, the bonding surfaces 3 of the primary member of airfoil portion 6 and the airfoil tip member 2 are mated to each other, and the orientations of the members are made to coincide with each other. Then, while pressing the primary member of airfoil portion 6 and the airfoil tip member 2 by a pressing mechanism 15 so as to exert a pressure 9 of 10 to 100 MPa on the bonding interface, a pulse voltage is impressed between the two members by a pulse power supply 10 to pass electric current therethrough, thereby heating the joint portion to temperatures of 1000 to 1280° C. by Joule heat, and the passage of electric current is continued to maintain the bonding temperature for 5 to 60 min, whereby the primary member of airfoil portion 6 and the airfoil tip member 2 are joined by diffusion bonding.

Where the members to be joined differ in shape or volume as in this embodiment, a difference in heating efficiency is generated between the members due to differences in electric resistance and heat capacity, resulting in that a heating temperature difference is generated. When the temperature difference is conspicuous, it is difficult to maintain the heating of the joint portion in the above-mentioned temperature range. In view of this, the member with a low heating efficiency (in this example, the primary member of airfoil portion 6) is heated by a heating means 18 other than the passage of electric current, for example, an electric heater, a high frequency induction coil, an arc lamp or the like, to maintain the joint portion in the above-mentioned temperature range, whereby good joining can be achieved. During the heating of the members, the ambient atmosphere is preferably controlled to a degree of vacuum of $10^{-3}$ to $10^{-7}$ Torr. Alternatively, an inert gas atmosphere such as argon may be used.

The pressure exerted on the bonding interface and the heating temperature (bonding temperature) are selected according to the materials and the mechanical and thermal properties of the members to be joined. The pressure is preferably controlled to within the range of 10 to 99% based on the tensile strength at the bonding temperature of the member that has the lowest tensile strength at the bonding temperature, and the heating temperature is preferably controlled to within 0.6 to 0.99 times the fusion temperature of the member which has the lowest fusion temperature. The heating maintaining period is determined in the range of 60 to 7200 sec, according to the pressure and the bonding temperature. It is effective to provide the pressure and the bonding temperature with time variations. That is, the bonding quality can be enhanced by a process in which the pressure is set to be lower in the beginning of the bonding to thereby increase the contact resistance at the bonding interface, and activation at the interface such as breakage of oxide film by minute discharge or local rapid heating is promoted, thereafter the pressure is increased to enhance adhesion at the bonding interface, and material diffusion is promoted. A method of bringing the airfoil tip member 2 into ultrasonic vibration 17 by use of an ultrasonic vibrator 5 at the beginning stage of passage of electric current as shown in FIG. 4 is effective in shortening the bonding time and enhancing the bonding quality, because the activation of the bonding interface such as breakage of oxide film can be thereby promoted, and the adhesion between the bonding surfaces 3 can be enhanced through minute plastic deformations of the members at the bonding interface. The ultrasonic vibration may be applied to the member directly or otherwise through a heating means 18 or an electrically conductive die 16.

In a fourth step, the rotor blade integrated by the bonding is machined to desired dimensions. In a fifth step, the joint portion is subjected to non-destructive inspection, and, in a sixth step, a heat treatment is carried out. In a seventh step, the airfoil portion is coated, and, in a final eighth step, a final inspection is conducted. A heat treatment may be performed between the first step and the second step, between the third step and the fourth step, or between the seventh step and the eighth step, as required.

The joint portion between the primary member of airfoil portion 6 and the airfoil tip member 2 obtained in the present embodiment has a strength equivalent to that of the single crystal nickel base alloy base metal forming the blade. This is probably because variations in the properties of the blade material under bonding heat affection are very small.

While the method of manufacturing the rotor blade by joining single crystal nickel base alloy members to each other has been described in this embodiment, the rotor blade can also be manufactured by joining of members formed of a directionally solidified nickel base alloy which is a crystal orientation controlled alloy, similarly to the single crystal nickel base alloy. In this case, of the crystal orientations of the members at the bonding interface, only the difference in <100> orientation which is the progressing direction of directional solidification is set within 5° between the members, whereby a joint portion substantially maintaining the crystal structure of the members can be obtained.

[Embodiment 2]

Figure 5:
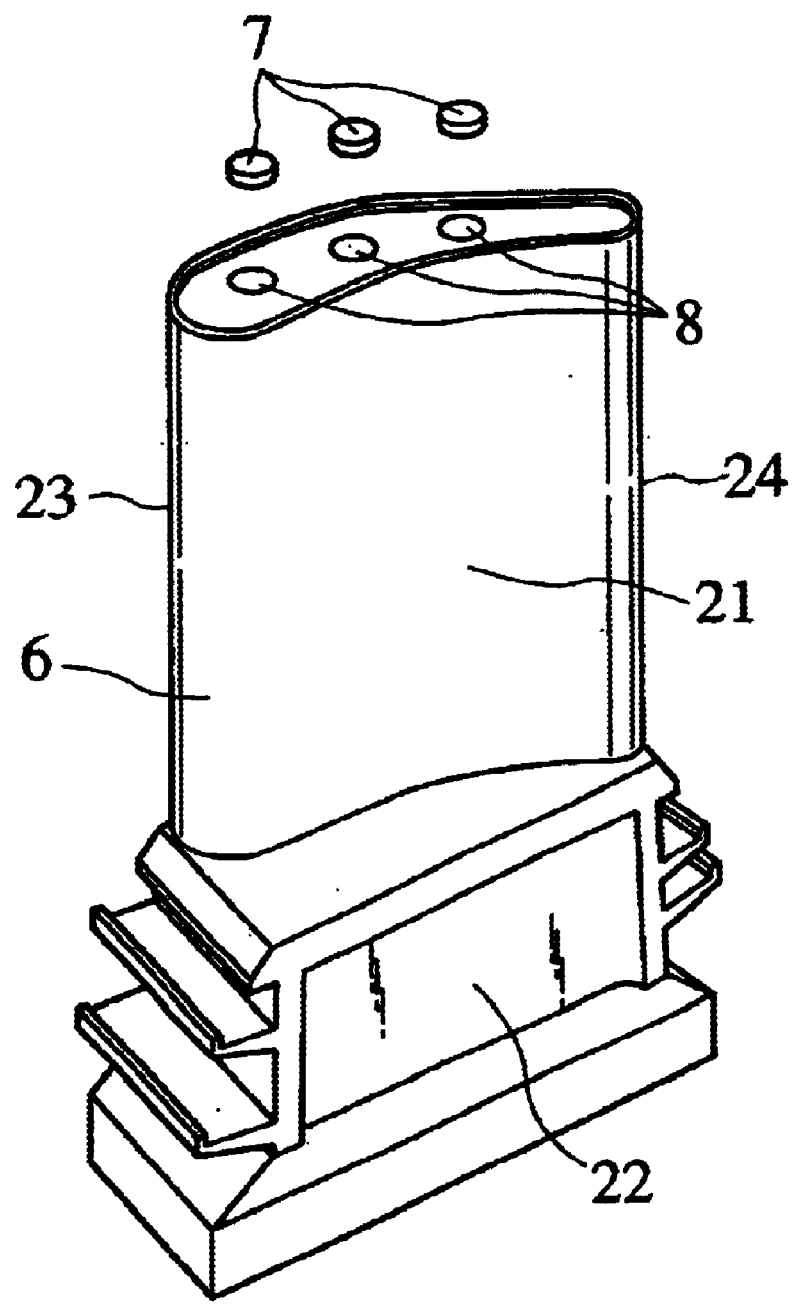
FIG. 5 is a perspective view showing the shapes of airfoil members before joining in Embodiment 2 of the present invention.

In this embodiment, a description will be made of an example of manufacturing a rotor blade by joining a plurality of tip cover plates 7 formed of a nickel base superalloy to core support holes 8 formed in the tip of a primary member of airfoil portion 6 formed of a single crystal nickel base alloy, as shown in FIG. 5.

Figure 6:
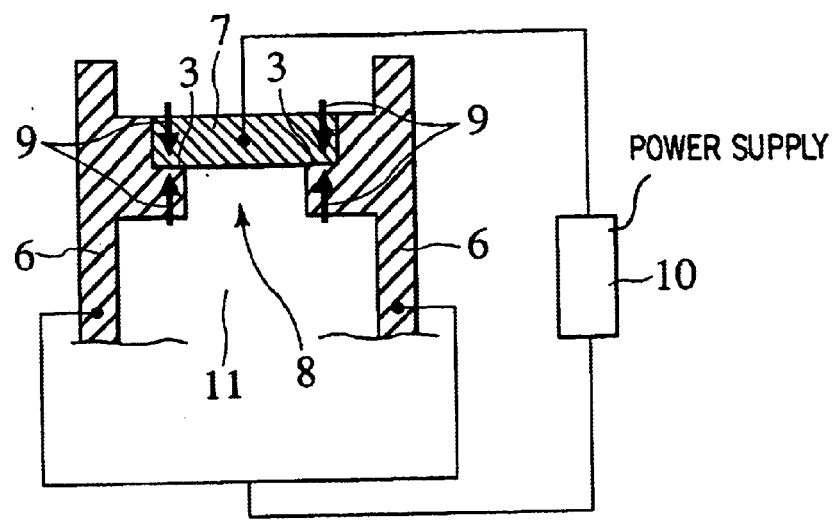
FIG. 6 is a sectional view showing the concept of the joining method in Embodiment 2 of the present invention.

First, in the same manner as in the first embodiment, a first step is performed in which the portion other than the tip cover plates 7 of the rotor blade is manufactured by precision casting. In this case, the airfoil tip of the primary member of airfoil portion 6 is provided with the core support holes 8, and cooling passages 11 in the blade are each in an open state. Next, in a second step, the core support holes 8 of the primary member of airfoil portion 6 and the tip cover plates 7 are machined so that both of them are fitted to each other to form a bonding interface 3 as shown in FIG. 6. The bonding interface 3 need not be a plain surface, but may have a curvature. While a conventional casting material of a nickel base superalloy is used for the tip cover plates 7 in this embodiment, a rolled material and a sintered material can also be used. Where a plurality of joint portions are present as in this embodiment, the shapes of the core support holes 8 and the tip cover plates 7 may be different for each of the joint portions.

Figure 7:
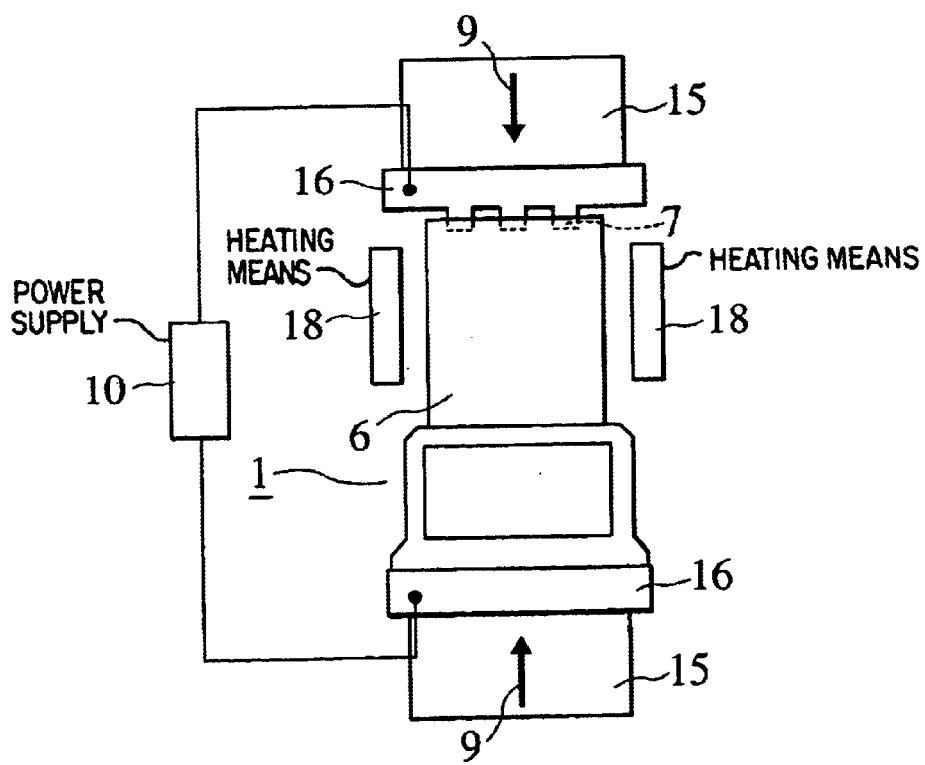
FIG. 7 is a conceptual diagram showing the constitution of the joining means in Embodiment 2 of the present invention.

In a third step, as shown in FIGS. 6 and 7, the bonding surfaces 3 of the primary member of airfoil portion 6 and the tip cover plates 7 are mated to each other. While pressing the primary member of airfoil portion 6 and the tip cover plates 7 so as to exert a pressure 9 of 10 to 100 MPa on the bonding interfaces 3 in the same manner as in the first embodiment, a pulse voltage is applied to the two members by a pulse power supply 10 to pass electric current therethrough, the joint portions are heated to a temperature of 1000 to 1280° C. by use of a heating means 18 other than the passage of electric current, for example, an electric heater, a high frequency induction coil, an arc lamp or the like, and the temperature is maintained for 5 to 60 min, whereby the primary member of airfoil portion 6 and the tip cover plates 7 are joined to each other by diffusion bonding. The heating means 18 other than the passage of electric current is used for restraining the heating temperature difference which might be generated between the members to be joined due to differences in the shape and volume of the members, namely, the differences in electric resistance and heat capacity, and for maintaining the heating of the joint portions in the above-mentioned temperature range.

Where a plurality of the joint portions are present as in this example, all the tip cover plates 7 may be joined at the same time as shown in FIG. 7, or otherwise may be joined separately in a plurality of steps. Good bonding is achieved by controlling the ambient atmosphere during the heating of the members to a degree of vacuum of $10^{-3}$ to $10^{-7}$ Torr or by using an inert gas atmosphere such as argon.

The pressure exerted on the bonding interface is controlled to within the range of 10 to 99% based on the lowest value of the tensile strengths of the members at the bonding temperature, the heating temperature is controlled to within the range of 0.6 to 0.99 times the lowest value of the fusion temperatures of the members, and the heating maintaining time is determined within the range of 60 to 7200 sec according to the pressure and the bonding temperature. In the same manner as in the first embodiment, it is effective in enhancing the bonding quality to provide the pressure and the bonding temperature with time variations so as to contrive activation of the bonding interface and promotion of material diffusion. It is also effective to vibrate the tip cover plates 7 by an ultrasonic vibrator at the beginning stage of the passage of electric current. The ultrasonic vibration may be applied to the member directly or otherwise through the heating means 18 or an electrically conductive die 16.

Thereafter, the fourth to eighth (final) steps are carried out in the same manner as in the first embodiment to manufacture a rotor blade in which the cooling passages 11 in the blade are sealed by bonding the tip cover plates 7 to the core support holes 8 of the blade tip.

The joint portions between the primary member of airfoil portion 6 and the tip cover plates 7 obtained in this embodiment have a strength equivalent to that of a conventional casting material of the nickel base superalloy which is the material of the tip cover plates 7. This is because the strength of the conventional casting material of the nickel base superalloy is lower than that of the single crystal nickel base alloy constituting the primary member of airfoil portion 6, and a lowering in strength due to bonding is little observed.

While the material of the tip cover plates 7 has been the conventional casting material of the nickel base alloy in this embodiment, the material may be a single crystal nickel base alloy having the same crystal structure as the primary member of airfoil portion 6, and the difference in <100> crystal orientation at the joint portions between the members may be controlled to within 5°, as by using the method described in the first embodiment, whereby it is possible to obtain joint portions having a strength equivalent to that of the single crystal nickel base alloy. Besides, where the primary member of airfoil portion 6 and the tip cover plates 7 are directionally solidified nickel base alloy members, only the difference in <100> orientation which is the progressing direction of directional solidification, of the crystal orientations of the members at the bonding interface, may be controlled to within 5° between the members, whereby it is possible to obtain joint portions substantially maintaining the crystal structure of the members. The rotor blade can be manufactured in the same manner also by using a combination of a directionally solidified nickel base alloy material and a conventional casting material of a nickel base superalloy.

[Embodiment 3]

In a third embodiment, an example will be described in which an airfoil tip 20 of a rotor blade 19 of which the airfoil tip 20 has been worn during use in an actual turbine is removed and a newly manufactured airfoil tip 2 is joined to the rotor blade 19 to manufacture a reusable rotor blade.

As shown in FIGS. 8A to 8C, in a first step, the airfoil tip 20 of the rotor blade 19 formed of a single crystal nickel base alloy and having been worn is removed by machining or the like. In a second step, the cut surface of the rotor blade 19 is machined to form a bonding surface 3a. Besides, the airfoil tip 2 is manufactured such that the <100> crystal orientation at the bonding surface 3b has an orientation difference of within 5° relative to the <100> crystal orientation at the bonding surface 3a of the other member. When the crystal orientation at the bonding surface 3a of the rotor blade 19 is unknown, the orientation is measured by X-ray diffraction method or the like. The airfoil tip 2 may be cropped by machining or the like from a single crystal nickel base alloy material of which the crystal orientation is preliminarily known, with reference to the <100> orientation at the bonding surface 3b.

Thereafter, the third to eighth (final) steps are carried out in the same manner as in the first embodiment to manufacture a rotor blade in which the new member is joined at the blade tip.

The joint portion of the airfoil tip 2 in the rotor blade 19 obtained in this example has a strength equivalent to that of the single crystal nickel base alloy material which is the base metal, and a lowering in strength due to bonding is little observed.

While the material of the airfoil tip 2 newly manufactured has been a single crystal nickel base alloy material in this embodiment, a conventional casting material of a nickel base superalloy may also be used. In this case, the strength of the joint portion is equivalent to that of the conventional casting material of the nickel base superalloy, the alignment of the crystal orientation at the bonding interface can be omitted, and a reduction in production cost can be achieved. In addition, the rotor blade 19 and the airfoil tip 2 may be formed of the same directionally solidified nickel base alloy material. In this case, only the difference in <100> orientation which is the progressing direction of directional solidification, of the crystal orientations of the members at the bonding interface, may be controlled to within 5° between the members, whereby it is possible to obtain a joint portion substantially maintaining the crystal structure of the members. The rotor blade can also be manufactured in the same manner by use of a combination of a directionally solidified nickel base alloy material and a conventional casting material of a nickel base alloy.

Figure 9A:
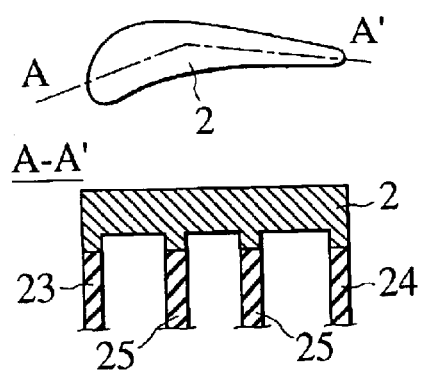
FIGS. 9A to 9F are top plan views of a turbine blade airfoil tip and sectional views of the airfoil tip ranging from the leading edge to the trailing edge thereof, showing examples of the joint structure according to the present invention.
Figure 9B:
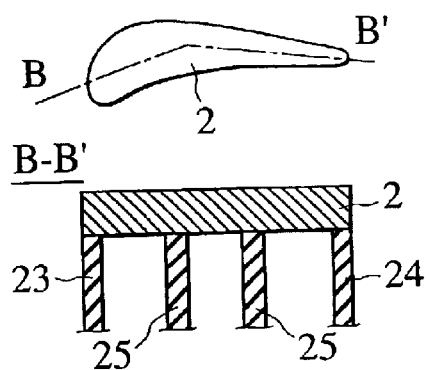
Figure 9C:
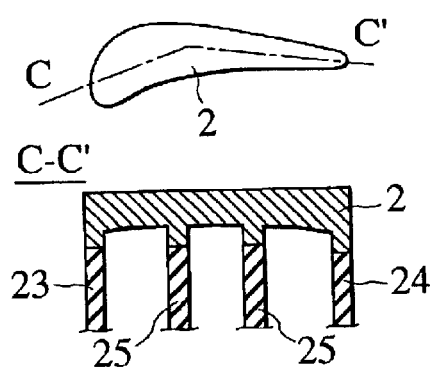
Figure 9D:
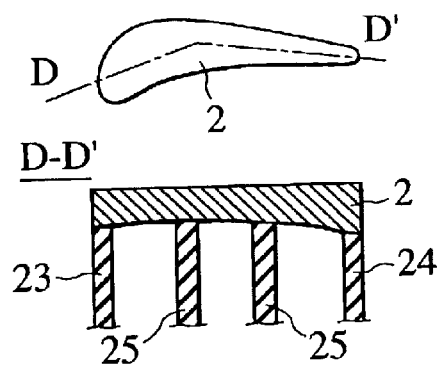
Figure 9E:
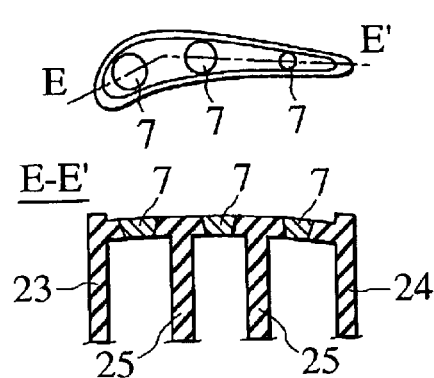
Figure 9F:
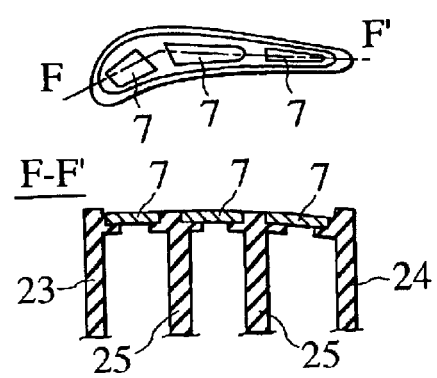

While the method for manufacturing the rotor blade by joining one or a plurality of members constituting the airfoil tip or a part thereof to the primary member of airfoil portion have been described in the above three embodiments, the structure of the joining portion or portions is not limited to the above embodiments. That is, structures shown in FIGS. 9A to 9F, which show top plan views of the airfoil tip and sectional views of the joint portion showing the sections of an outer peripheral portion 23 of the leading edge of airfoil portion, an outer peripheral portion 24 of the trailing edge of airfoil portion, ribs 25 for forming the cooling passages in the airfoil, and the airfoil tip 2 or the tip cover plates 7, may be adopted. To be more specific, FIG. 9A shows an example of a structure in which an airfoil tip 2 provided with ribs having bonding surfaces machined to a plain surface is joined to the tip of a primary member of airfoil portion 6 having a bonding surface machined to a plain surface. FIG. 9B shows an example of a structure in which a plate-shaped airfoil tip 2 having a bonding surface machined to a plain surface is joined to the tip of a primary member of airfoil portion 6 having a bonding surface machined to a plain surface. FIG. 9C shows an example of a structure in which an airfoil tip 2 provided with ribs having bonding surfaces machined to a curved surface with the same radius of curvature as a bonding surface of a primary member of airfoil tip 6 machined to a curved surface is joined to the tip of the primary member of airfoil tip 6. FIG. 9D shows an example of a structure in which an airfoil tip 2 having a bonding surface machined to a curved surface with the same radius of curvature as a bonding surface of a primary member of airfoil portion 6 machined to a curved surface is joined to the tip of the primary member of airfoil portion 6. FIG. 9E shows an example of a structure in which a primary member of airfoil portion 6 having core support holes at the tip thereof is machined to provide the core support holes with tapered bonding surfaces, and plug-shaped tip cover plates 7 fittable to the tapered bonding surfaces are joined to the tip of the primary member of airfoil portion 6. FIG. 9F shows an example of a structure in which a primary member of airfoil portion 6 having core support holes at the tip thereof is machined to provide frame-shaped bonding surfaces in the peripheries of the core support holes, and plate-shaped tip cover plates 7 fittable to the bonding surfaces are joined to the tip of the primary member of airfoil portion 6.

The structure of the joint portion and the combination of the materials of the primary member of airfoil portion and the airfoil tip are selected by taking into account the design strength (required strength) determined according to use conditions of the blade, production efficiency, and production cost. In the above embodiments, good bonding quality has been obtained by using a single crystal nickel base alloy containing, in wt. %, 0.07 of carbon (C), 7.1 of chromium (Cr), 1.0 of cobalt (Co), 0.8 of molybdenum (Mo), 8.8 of tungsten (W), 0.8 of niobium (Nb), 5.1 of aluminum (Al), 0.02 of boron (B), 8.9 of tantalum (Ta), 0.25 of hafnium (Hf), and 3.0 of rhenium (Re), the balance being nickel (Ni) as the material of the primary member of airfoil portion, and using the single crystal nickel base alloy or a nickel base heat-resistant alloy containing, in wt. %, 0.1 of carbon (C), 16.0 of chromium (Cr), 8.5 of cobalt (Co), 1.75 of molybdenum (Mo), 2.6 of tungsten (W), 0.9 of niobium (Nb), 3.4 of titanium (Ti), 3.4 of aluminum (Al), less than 0.5 of iron (Fe), 0.01 of boron (B), 1.75 of tantalum (Ta), less than 0.15 of copper (Cu), the balance being nickel (Ni) as the material of the airfoil tip. Other than the above-mentioned nickel base alloys, not only general nickel base heat-resistant alloys but also a single crystal nickel base alloy containing, in wt. %, less than 0.1 of carbon (C), 2.0–10.0 of chromium (Cr), 1.0–15.0 of cobalt (Co), 0.4–3.0 of molybdenum (Mo), 5.0–10.0 of tungsten (W), less than 1.5 of niobium (Nb), less than 5.0 of titanium (Ti), less than 7.0 of aluminum (Al), 3.0–9.0 of tantalum (Ta), less than 0.3 of hafnium (Hf), less than 7.0 of rhenium (Re), and 55.0–70.0 of nickel (Ni) together with selective minor additives and unavoidable impurities, and a directionally solidified alloy containing, in wt. %, less than 0.1 of carbon (C), 5.0–15.0 of chromium (Cr), 8.0–11.0 of cobalt (Co), 0.5–5.0 of molybdenum (Mo), 2.0–10.0 of tungsten (W), less than 1.0 of niobium (Nb), 0.5–6.0 of titanium (Ti), 2.0–6.0 of aluminum (Al), 1.0–4.0 of tantalum (Ta), 0.5–2.0 of hafnium (Hf), and 57.0–63.0 of nickel (Ni) together with selective minor additives and unavoidable impurities, may be used, whereby good bonding can be achieved without substantially changing the crystal structure and mechanical properties of the base metal.

While heating by an auxiliary heat source and application of ultrasonic vibration have been described as an auxiliary means for the heating and bonding by pulse current in the above embodiments, these means may be used either singly or in combination, according to the materials, shapes and mass balance of the members to be joined, the bonding structure and the like, whereby such effects as shortening the bonding time and enhancement of joint reliability can be expected.

The present invention is suited not only to the case of manufacturing the rotor blade by forming the airfoil tip through joining as in the above embodiments but also to the case of manufacturing a rotor blade by integrating a plurality of members through bonding.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A method for manufacturing a turbine blade by producing an airfoil portion and a dovetail portion, comprising:

bringing a plurality of members to be joined into contact with each other, applying pressure to the members to keep a contact state thereof, and applying a pulse voltage to the members to pass an electric current therethrough so as to heat a bonding interface by resistance heating for diffusion bonding to join the members, wherein the bonding interface is auxiliary-heated by auxiliary heating other than the passing of electric current when diffusion bonding.

2. A method for manufacturing a turbine blade as set forth in claim 1, wherein one of the members has a low heating efficiency that is subjected to the auxiliary heating.

3. A method for manufacturing a turbine blade with an airfoil portion of a turbine blade and a dovetail portion, comprising:

bringing members to be joined into contact with each other, applying pressure to the members to keep a contact state thereof, and applying a pulse voltage to the members to pass an electric current therethrough so as to heat a bonding interface by resistance heating for diffusion bonding, wherein the members are subjected to ultrasonic vibration during heating by the passing of electric current to join the members.

4. A method for manufacturing turbine blade as set forth in claim 3, wherein the bonding interface is auxiliary-heated by auxiliary heating other than the passing of electric current.

5. A method for manufacturing a turbine blade by producing an airfoil portion and a dovetail portion, comprising:

bringing a plurality of members to be joined into contact with each other, applying pressure to the members to keep a contact state thereof, and applying a pulse voltage to the members to pass an electric current therethrough so as to heat a bonding interface by resistance heating for diffusion bonding to join the members, wherein the members are each formed of a nickel base superalloy, wherein at least part of the members are formed of crystal orientation controlled alloys having the same crystal structure, wherein the members are so oriented that a difference in <100> crystal orientation between the crystal orientation controlled alloys at the joint portion between the crystal orientation controlled alloy members is within 5°, and wherein the crystal orientation controlled alloy members constituting the turbine blade are cropped from a single casting with the <100> crystal orientation at the bonding interface aligned, in order to orient the members constituting the turbine blade.

* * * * *